US009395970B2

(12) United States Patent
Lerner

(10) Patent No.: US 9,395,970 B2
(45) Date of Patent: Jul. 19, 2016

(54) METHOD AND APPARATUS FOR PROVIDING A TIME PERIOD FOR STARTING AN APPLICATION

(71) Applicant: Sony Computer Entertainment America LLC, San Mateo, CA (US)

(72) Inventor: Edward Adam Lerner, San Francisco, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

(21) Appl. No.: 14/501,831

(22) Filed: Sep. 30, 2014

(65) Prior Publication Data
US 2016/0092187 A1    Mar. 31, 2016

(51) Int. Cl.
*G06F 9/445* (2006.01)
*H04L 29/08* (2006.01)

(52) U.S. Cl.
CPC . *G06F 8/61* (2013.01); *H04L 67/10* (2013.01)

(58) Field of Classification Search
CPC ............... G06F 8/60; G06F 8/61; G06F 8/65
USPC .................. 717/170–178; 709/203
See application file for complete search history.

(56) References Cited

U.S. PATENT DOCUMENTS

| | | | | |
|---|---|---|---|---|
| 6,038,399 A * | 3/2000 | Fisher | G06F 8/60 | 713/1 |
| 6,185,598 B1 * | 2/2001 | Farber | G06F 9/505 | 709/200 |
| 6,279,030 B1 * | 8/2001 | Britton | G06F 9/44521 | 707/999.01 |
| 6,401,239 B1 * | 6/2002 | Miron | G06F 8/68 | 707/661 |
| 6,701,522 B1 * | 3/2004 | Rubin | G06F 21/35 | 709/220 |
| 7,096,465 B1 * | 8/2006 | Dardinski | G05B 19/0426 | 717/121 |
| 7,143,407 B2 * | 11/2006 | Rajaram | G06F 8/68 | 455/419 |
| 7,150,015 B2 * | 12/2006 | Pace | G06F 8/60 | 709/236 |
| 7,246,351 B2 * | 7/2007 | Bloch | G06F 8/61 | 715/700 |
| 7,562,112 B2 * | 7/2009 | Harrow | H04L 47/10 | 709/203 |
| 7,580,972 B2 * | 8/2009 | Jones | H04L 29/06 | 370/230 |
| 7,730,484 B2 * | 6/2010 | von Tetzchner | G06F 13/4027 | 715/744 |
| 7,870,550 B1 * | 1/2011 | Qureshi | G06N 5/048 | 717/168 |
| 7,930,693 B2 * | 4/2011 | Ottamalika | G06F 8/60 | 709/219 |
| 8,255,894 B2 * | 8/2012 | Nakagawa | G06F 8/65 | 717/168 |

(Continued)

OTHER PUBLICATIONS

Dastidar et al, "Safe Peer-to-Peer Self-Downloading", ACM Transactions on Autonomous and Adaptive Systems, vol. 3, No. 4, Article 19, pp. 1-18, 2008.*

(Continued)

*Primary Examiner* — Anil Khatri
(74) *Attorney, Agent, or Firm* — Frommer Lawrence & Haug LLP; William S. Frommer; Paul A. Levy

(57) ABSTRACT

Disclosed are methods and systems for determining the time for a remote computer to begin executing an application downloaded over a network. A portion of the application to begin execution of the application is determined. The portion is less than the entirety of the application. The time to start the application on a remote computer is calculated and displayed. The time to start can be calculated based on an obtained a speed of the network to the remote computer, a time to transmit the portion of the application to the remote computer based on the portion of the application and the obtained connection speed, and a loading time for the portion of the application to load on the remote computer.

11 Claims, 4 Drawing Sheets

(56) References Cited

U.S. PATENT DOCUMENTS

| | | | | |
|---|---|---|---|---|
| 8,706,937 | B2* | 4/2014 | Cruickshank | G06F 11/349 710/110 |
| 8,862,917 | B2* | 10/2014 | Ulmer | G06F 1/3203 712/28 |
| 8,869,141 | B2* | 10/2014 | Lauwers | G06F 3/16 717/171 |
| 8,910,146 | B2* | 12/2014 | Emejulu | G06Q 10/1091 717/133 |
| 8,910,150 | B2* | 12/2014 | Lederer | H04L 67/34 717/178 |
| 9,021,471 | B2* | 4/2015 | DeLuca | G06F 8/71 717/120 |
| 9,053,029 | B2* | 6/2015 | Roy | G06F 12/084 |
| 2002/0194325 | A1 | 12/2002 | Chmaytelli et al. | |
| 2008/0178298 | A1 | 7/2008 | Arai et al. | |
| 2010/0318988 | A1 | 12/2010 | Barr et al. | |
| 2013/0125055 | A1 | 5/2013 | Nakaya et al. | |
| 2014/0236493 | A1 | 8/2014 | Park et al. | |

OTHER PUBLICATIONS

Ananthanarayanan et al, "COMBINE: Leveraging the Power of Wireless Peers through Collaborative Downloading", ACM, pp. 286-298, 2007.*

Tyndall, "Building an Effective Software Deployment Process", ACM, pp. 109-114, 2012.*

Bernini et al, "A Software Architecture for the Deployment of Executable Transformation Models", ACM, pp. 47-51, 2009.*

Dolstra, "Secure Sharing Between Untrusted Users in a Transparent Source/Binary Deployment Model", ACM, pp. 154-163, 2005.*

Marquardt "Patterns for Software Release Versioning" ACM, pp. 1-13, 2010.*

International Search Report issued in corresponding International Application No. PCT/US15/46486 mailed Nov. 30, 2015.

* cited by examiner

METHOD AND APPARATUS FOR PROVIDING A TIME PERIOD FOR STARTING AN APPLICATION

BACKGROUND

1. Field of the Invention

This disclosure relates generally to data processing, and more specifically to methods and systems for acquiring new software applications.

2. Description of the Related Art

Software traditionally was distributed on disk. Acquiring additional software required either a trip to the store or waiting for a package with a disk to be delivered. Then the disk would be inserted into the computer and after a few clicks an installation process would begin. Depending on the number of disks and other factors, the installation process could be long and annoying.

With the rise of the Internet, software increasingly is distributed electronically, over the Internet. In particular mobile devices have made installing software very convenient, with mobile manufacturers mandating relatively small installation packages so that consumers could quickly go from ordering software in the application store to running the software.

However there are applications that require more storage. Download times for games and other content rich media software can be far larger than say a weather application. For instance a large game can require 10-50 Gigabytes of file installs. On a low grade Internet connection this can require a download lasting hours or even days. Thus, the delay between ordering a large application and the time to start using the application becomes increasingly long and annoying to the user.

To minimize this annoyance the downloading and installation of applications has been moved to the background, so that use of the device can continue while a new, large application is being delivered and installed.

Hiding the installation does not solve one concern of the customer, which is, "when will I be able to play this game, or use this application?" If a consumer wants to play a game in twenty minutes and the acquisition process takes five hours, they will be unhappy if they sit around and start waiting.

As games and other large applications have grown larger than our Internet connections have increased in speed, the problem of delays before start of play has also increased. Today many expensive games or applications can take hours from the time they are purchased to the time that a user can start to play the desired game or use the application.

One solution is for large application makers to modify their applications so that only a part, the first part, must be downloaded and installed before the end user can start to use that application. This solution leads to interesting situation. Two applications, both of the same size, say fifty gigabytes, can have very different times to start use, if one application is modified to be split into functional parts, and the other is not. If the modified application first functional part is only one gigabyte then it may take only one-fiftieth as long to start using that one versus the un-modified application.

For the end user eager to begin using an application this time savings is important, and may influence their purchasing decision, somewhat analogous to how movie watchers may choose certain movies based on when they are starting that evening or how long the movie will run. That is, a consumer's desire may be based on how long before the consumer must wait to have that desire fulfilled.

As happy end-users are important to any business, we wish to show end-users how long they will have to wait to use an application if they determine to acquire that application.

SUMMARY OF THE DISCLOSURE

The disclosure describes an apparatus and methods for providing an estimate of the time it would take to start using an application if that consumer ordered that application now, thus kicking off the download and install process, and is a time period less than an estimate of time to download the entire application. The phrase used in this application for this time estimate is "Playgo," "Playgo time," or "Playgo rating." That is, the Playgo time is for an application that does not need to completely download to start running and is the amount of time from the start of downloading the application until that application can start running. This PlayGo rating could be displayed along with the price and other information about the game to enable the consumer to make an appropriate buying decision.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The PlayGo time could be represented in hours:minutes, or minutes:seconds, for instance 1:33, or visually as a clock, bar, etc. This time could be displayed near the purchase or download button. If a download-install process is in progress the representation of the Playgo time could be updated to reflect progress made so far or could show an estimate left till the application can begin to run.

The PlayGo time estimate could be based on several factors as discussed herein below.

One factor is the size of initial download required to start using the application. This size could be calculated in a variety of methods, for instance counting the download size until the application actually starts (in a test environment) or simply stored as metadata about the game package.

What is initially downloaded might vary based on language (English, Mandarin, etc.) or resolution (720p, 1080p) and other settings. If this is the case, then the PlayGo time could be recalculated based on the end user choices or system settings in effect at the time that the PlayGo time needs to be displayed for a particular product.

The expected speed of the download is also a factor in the Playgo time. The expected speed could be based on a brief speed test, or based on the previous downloads to the connected machine and location, or based on other downloads from similar or nearby locations. As the download proceeds the PlayGo time remaining could be adjusted by both the download size remaining and the recent speed of the connection from store to end user equipment. That is, the Playgo time can be dynamically recalculated as the download process is occurring to provide, for example, an estimate of the time remaining till the application can begin to run.

Once both the size and speed are known it is straightforward to calculate download time. These time calculations can be verified on test machines or by any means known in the art.

An additional factor is the time to install the downloaded package. For a console or other known set of hardware, this install time can either be calculated or measured by installs on a known or 'standard' machine. If end user machines vary in installation speed, then, as with downloading the application discussed above, the installation time could be calculated based on a brief speed test, based on previous downloads, or based on similar machines elsewhere. As the install proceeds the PlayGo time remaining-could be adjusted by the amount of application remaining to be installed and the current speed of the end user machine.

As downloading and installation may proceed in parallel this effect can be measured on test machines, or calculated based on known speeds and sizes.

If information about specific download speed to or installation speed for an end-user machine is unavailable the system could use an average based on the region or machines of that type.

In accordance with one embodiment of the disclosure, a system for indicating how much time it would take before an application can start to be used on an end-user machine is provided. The system may comprise a processor and a database. The processor may be configured to register an application with application store to create a downloadable ready application. Additionally, the processor may be configured to register a user with the application store to create a user account.

When the application is registered with the application store, the application may be measured for the time required to download and install on a standard machine with standard connectivity. This can become the default PlayGo time. That is, the Playgo time comprises the time to download at least a portion of the application sufficient to start the application to run plus the time for the portion of the application to be installed.

When users register with the application store their machine(s) may also measured for download or installation speed. If their machines are faster or slower than normal, this factor is stored in the database, and used to calculate a more precise PlayGo time, to be presented as necessary to the user. In this embodiment, the Playgo time presented to a registered user is a function of the registered user's information stored in the database. That is, the Playgo time for each user can be different.

To the accomplishment of the foregoing and related ends, the one or more embodiments comprise the features hereinafter fully described and particularly pointed out in the claims. The following description and the drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The approaches and principles disclosed herein relate to computer-implemented methods and systems for processing of the time to begin using or playing an Application delivered online through, for example, an online application store or other network connected provider.

Figure 1:
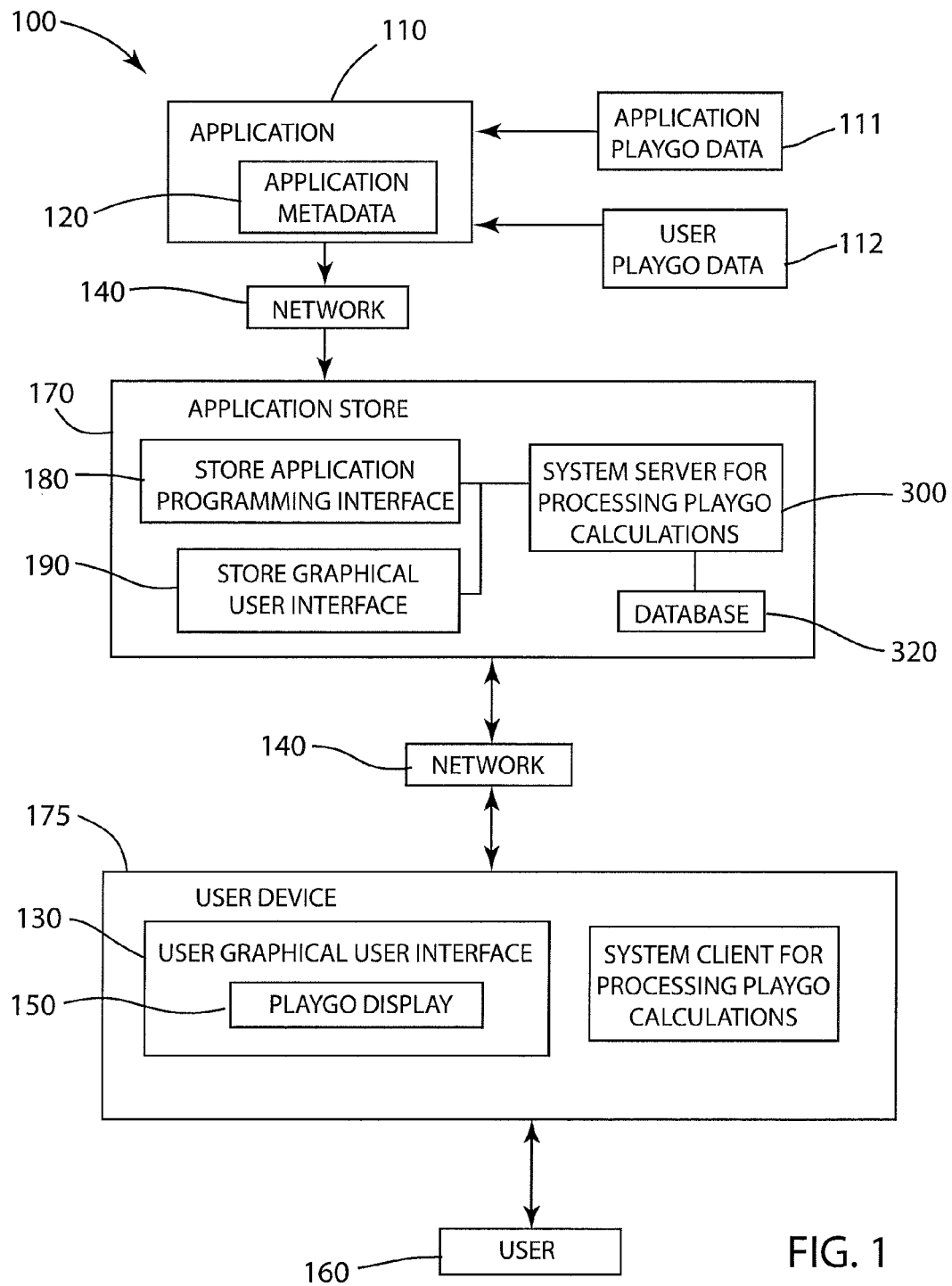
FIG. 1 is a block diagram showing an environment within which a method and system for PlayGo time can be implemented, in accordance with an example embodiment.

FIG. 1 is a block diagram showing an example environment 100 within which a method and system for processing of PlayGo time can be implemented. The example environment 100 may include an application 110, application PlayGo data 111, user PlayGO data 112, application metadata 120, a graphical user interface 130, network 140, PlayGo display 150, user 160, application store 170, store application programming interface 180, store graphical user interface 190.

The application 110 may include a game for a PC, mobile device or a game console such as Sony's PlayStation® (PS4), an expansion pack, add-on, patch or map for a game, or a non-game application.

The application PlayGo data 111 may include information on the application or application package, what application code, data or patches have already been requested, downloaded or installed and what is left to download and install, what map or screen resolutions or languages have been requested, downloaded or installed, how to divide up the application 110 into smaller components, and how to sequence the installation of these additional components.

The user PlayGo data 112 may include information about the user's hardware and preferences including free hard disk space, type of connection, speed of connection, level of subscription, preferences about language, multiplayer, etc.

The application metadata data 120 may include additional information about the application 110 or application package or download including package size and download and disk rate information, which languages or screen resolutions are available, how many packages are available and what size, etc.

The PlayGo display 150 may include how much time remains before the user can begin playing. This display can be represented digitally or in an analog fashion. It may include suggestions to reduce this time (e.g., by changing languages or resolution). If no time remains, the PlayGo display can be used to start or cancel the start of the application.

The store graphical user interface 190 and store application programming interface 180 may be associated with a server system for processing PlayGo time calculations 300 enabling accurate display of the time to start an application associated with an application store 170. The store graphical user interface 190 is for communicating with individuals, whereas the store application programming interface 180 is for communicating with networked computers. User 160 may access an online resource associated with the application 110, via a network 140, through a user device 175.

The network 140 may include the Internet or any other network capable of communicating data between electronic devices.

The user device 175 may include a mobile telephone, a computer, a laptop, a smart phone, a tablet PC, and so forth.

The user 160, in some embodiments, may be a person interacting with the graphical user interface (GUI) 130 via one of the user devices 170. The user 160 may be registered with the system for processing of PlayGo time calculation 300 and have information on available sizes and times of the applications in the application store stored in a database 320 of the system for calculating PlayGo time 300.

Figure 2:
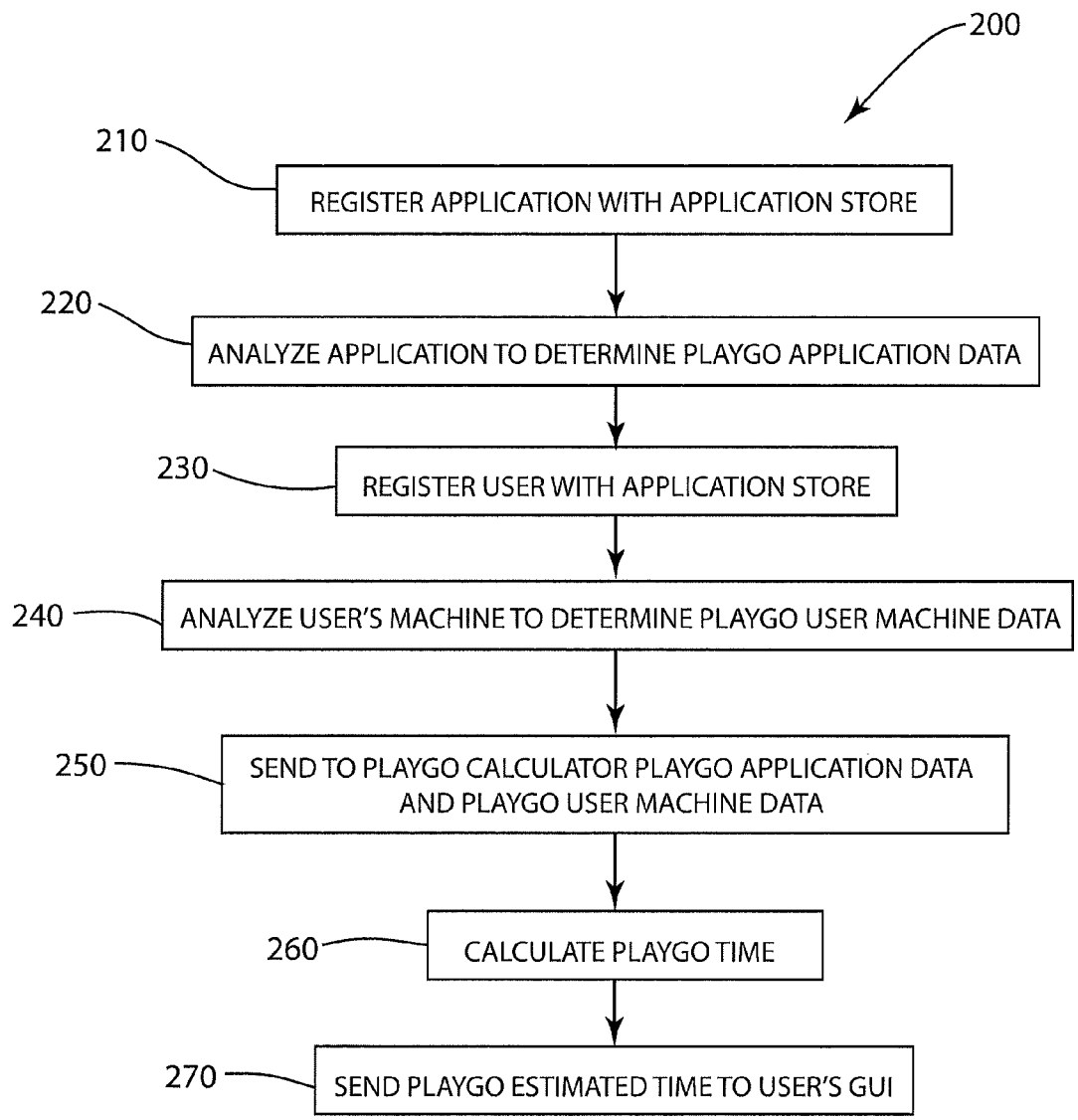
FIGS. 2 and 3 show a flow chart of a method for processing PlayGo time, in accordance with some example embodiments.

FIG. 2 shows a flow chart of a method 200 for processing of a PlayGo time calculation. The method 200 may be performed by processing logic that may comprise hardware such as a processor (e.g., dedicated logic, programmable logic, and microcode), software (such as computer code executable on a general-purpose computer system or a specifically configured computer system), or a combination of both. In one example embodiment, the processing logic resides at the system 300 illustrated in FIG. 3. The method 200 may be performed by the various modules discussed above with reference to FIG. 3. Each of these modules may comprise processing logic.

As shown in FIG. 2, the method 200 may commence at operation 210 with registering an application with an application store to add the application to the application store. Then the process system analyzers the just added application to determine the number and size of its discrete parts, and any dependency from part to part at operation 220. Users must also register with the Application store in order to access digital products in the store at operation 230. When the user sign into the Application store, the store can send a request to the user's machine to determine how fast the connection is to that machine at operation 240, and any other information related to calculating download or installation speed. Once the properties of both the application and end point hardware and connectivity are know then the PlayGo calculator can do the math to determine the expected download and install speed, assuming there are no other changes at operation 250, and then calculate the PlayGo time based at operation 260 and finally send the PlayGo estimated time to the User's GUI at operation 270.

Figure 3:
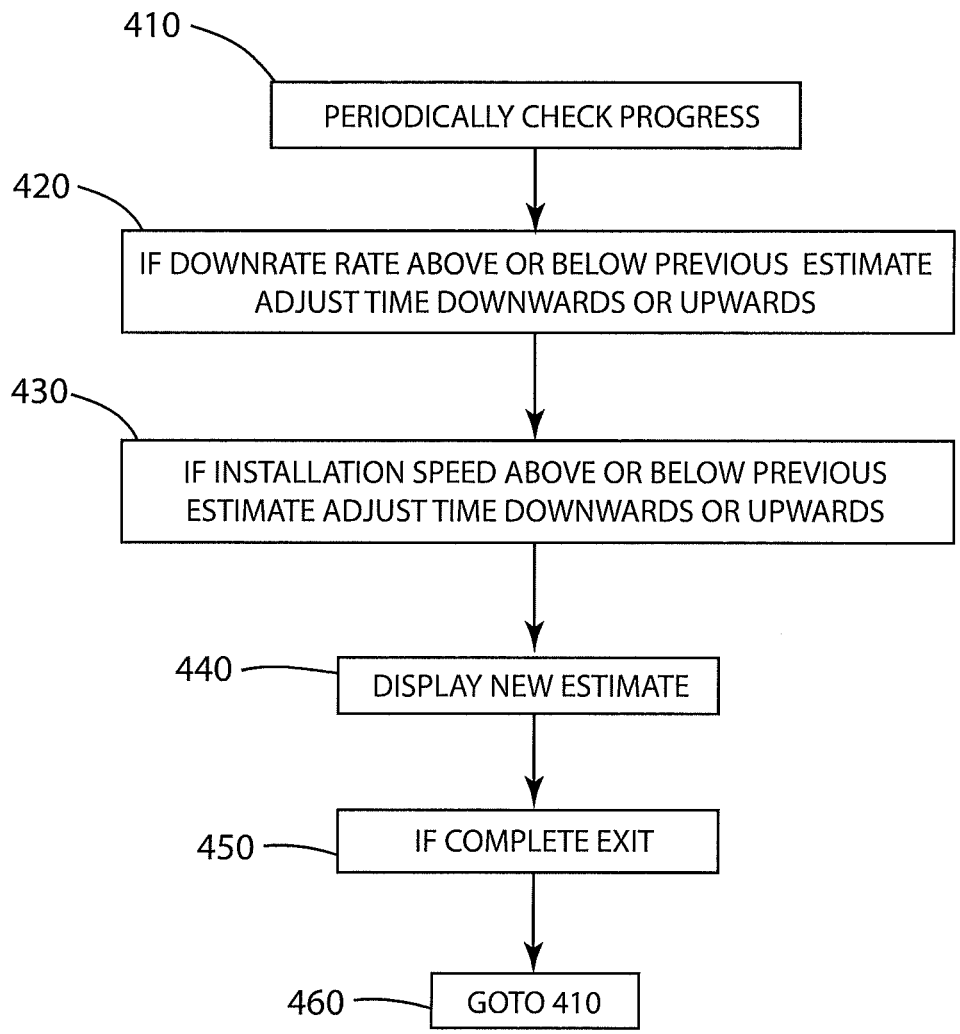

As shown in FIG. 3, the method 400 may commence at operation 270 as the user begins to download and install their new application. The system begins to check if the actual progress speed matches the estimated progress speed at operation 410. If the download rate is below previous estimates the estimated time is increased proportionally, or if the download rate exceeds previous estimates the estimated time is decreased proportionally, at FIGS. 420 and 430 respectively. These revised estimates are displayed at operation 440. This monitoring process continues at operation 460, or terminates upon completion of the download and install at operation 450.

Figure 4:
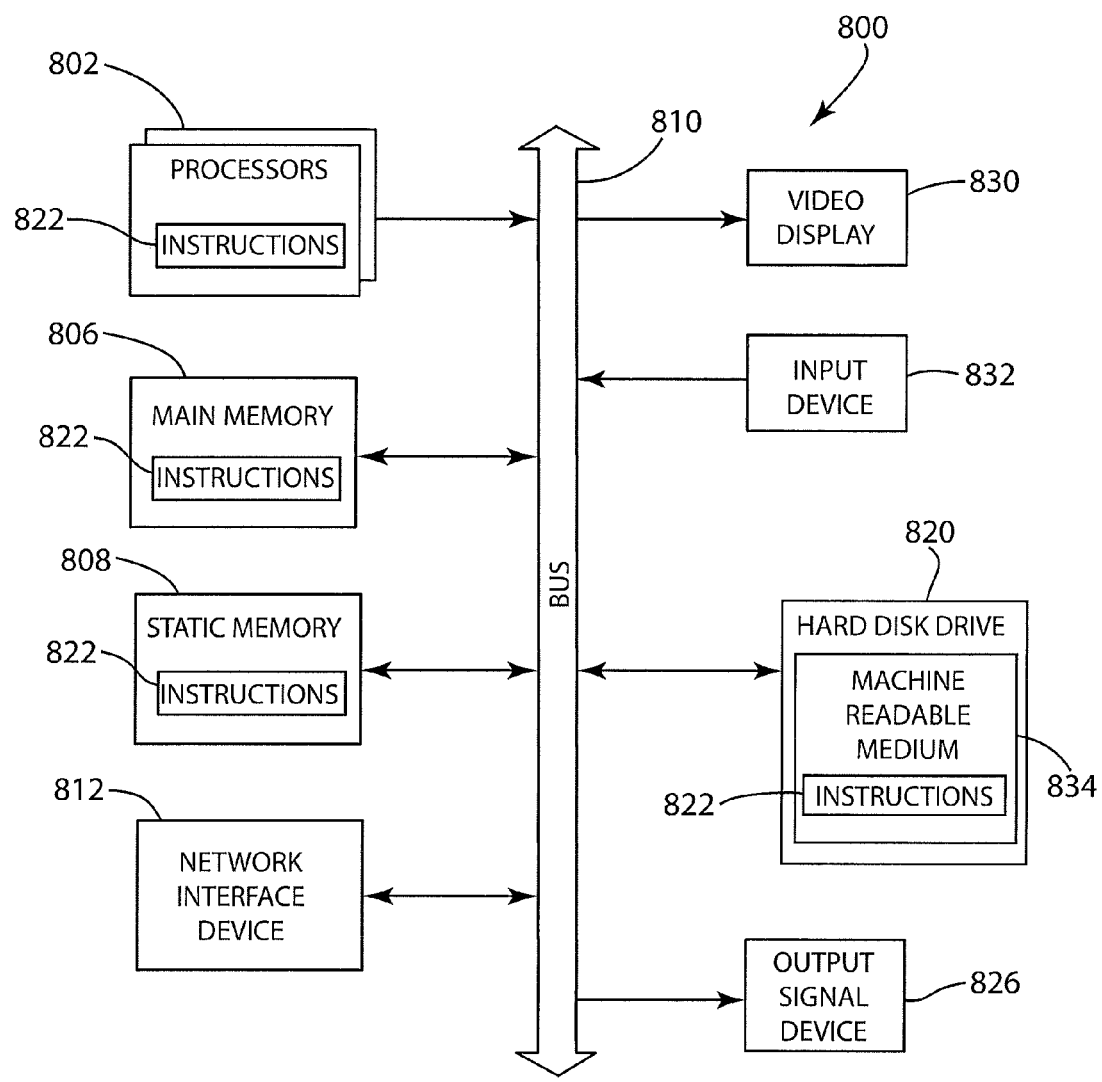
FIG. 4 shows a diagrammatic representation of a computing device for a machine in the exemplary electronic form of a computer system, within which a set of instructions for causing the machine to perform any one or more of the methodologies discussed herein, can be executed.

FIG. 4 is a diagrammatic representation of an example machine 800 in the form of a computer system within, which a set of instructions for causing the machine to perform any one or more of the methodologies discussed herein is executed. In various example embodiments, the machine operates as a standalone device or may be connected (e.g., networked) to other machines. The machine may include its own internal database or be connected to an external database in order to provide substantially real time updates. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 800 includes a processor or multiple processors 802 (e.g., a central processing unit (CPU), a graphics processing unit (GPU), or both), a main memory 806, and a static memory 808, which communicate with each other via a bus 810. The computer system 800 may further include a video display unit 830 (e.g., a liquid crystal display (LCD)). The computer system 800 may also include one or more devices 832 such as a keyboard, a cursor control device such as a mouse, a voice recognition or biometric verification unit (not shown), a disk drive unit 820, an output signal generation device 826 (e.g., a speaker), and a network interface device 812. The machine 800 may further include a data encryption module (not shown) to encrypt data.

The disk drive unit 820 includes a computer-readable medium 834 on which is stored one or more sets of instructions and data structures (e.g., instructions 822) embodying or utilizing any one or more of the methodologies or functions described herein. The instructions 822 may also reside, completely or at least partially, within the main memory 806 and/or within the processors 802 and/or static memory 808 during execution thereof by the machine 800. The main memory 808 and the processors 802 may also constitute machine-readable media.

The instructions 822 may further be transmitted or received over a network via the network interface device 812 utilizing any one of a number of well-known transfer protocols (e.g., Hyper Text Transfer Protocol (HTTP)). While the computer-readable medium 834 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Thus, a system and method for processing of calculating time to start play have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense. Other embodiments are within the scope of the following claims.

What is claimed is:

1. A method for calculating the time to begin using an application, the method comprising:
   connecting a remote computer through a network to a server having the application;
   determining a size of a portion of the application needed to begin execution of the application on the remote computer, the portion being less than the entirety of the application;
   calculating the time to load the portion needed to start the application on the remote computer; and
   transmitting the calculated time to begin the application to the remote computer,
   wherein the calculated time is a graphic indicating the time remaining to begin execution of the application that is updated as the application is transmitted to the remote computer.

2. The method of claim 1, wherein calculating the time to start the application on the remote computer comprises:
   obtaining a connection speed of the network connection to the remote computer;
   determining a transmitting time to transmit the portion of the application to the remote computer based on the size of the portion of the application and the obtained connection speed; and
   obtaining a loading time for the portion of the application to load on the remote computer.

3. The method of claim 2, wherein the obtained loading time is an estimate of the loading time.

4. The method of claim 2, wherein the speed of the connection and the loading time for the remote computer are obtained from a database of registered computers.

5. The method of claim 4, wherein the speed of the connection and the loading time for the remote computer are historical values from transmission of other applications to the remote computer.

6. The method of claim 1, wherein determining the connection speed of the remote computer is based on a test of the network connection speed.

7. The method of claim 1, wherein determining the size of the portion of the application to begin execution is based on information provided by an application provider.

8. The method of claim 1, wherein the displayed calculated time is provided in minutes and seconds.

9. The method of claim 1, comprising:
   enabling purchase of the application on the server from the remote computer,
   wherein the displayed calculated time is displayed adjacent a mechanism for initiating the purchase of the application.

10. A computer implemented method for processing of calculating the time to begin using an application, the method comprising:
    registering an application with an application store, the application registration having application metadata, the metadata including an indication of a portion of the application less than the entirety of the application that enables the application to begin execution;
    registering a user with the application store to create the necessary user metadata;
    receiving, from the user, updated network and installation speed information;
    calculating, based on the user and application metadata an initial time calculation to begin execution of the application;
    updating, based on actual download characteristics, a current time to begin execution of the application; and
    displaying the current time to begin execution of the application,
    wherein the calculated time is a graphic indicating the time remaining to begin execution of the application that is updated as the application is transmitted to the remote computer.

11. A non-transitory computer-readable medium comprising instructions, which when executed by one or more processors, perform the following operations:
    registering an application with an application store, the application registration having application metadata, the metadata including an indication of a portion of the application less than the entirety of the application that enables the application to begin execution;
    registering a user with the application store to create the necessary user metadata;
    receiving, from the user, updated network and installation speed information;
    calculating, based on the user and application metadata an initial time calculation to begin execution of the application;
    updating, based on actual download characteristics, a current time to begin execution of the application; and
    displaying the current time to begin execution of the application,
    wherein the calculated time is a graphic indicating the time remaining to begin execution of the application that is updated as the application is transmitted to the remote computer.

* * * * *